United States Patent Office 3,353,518
Patented Nov. 21, 1967

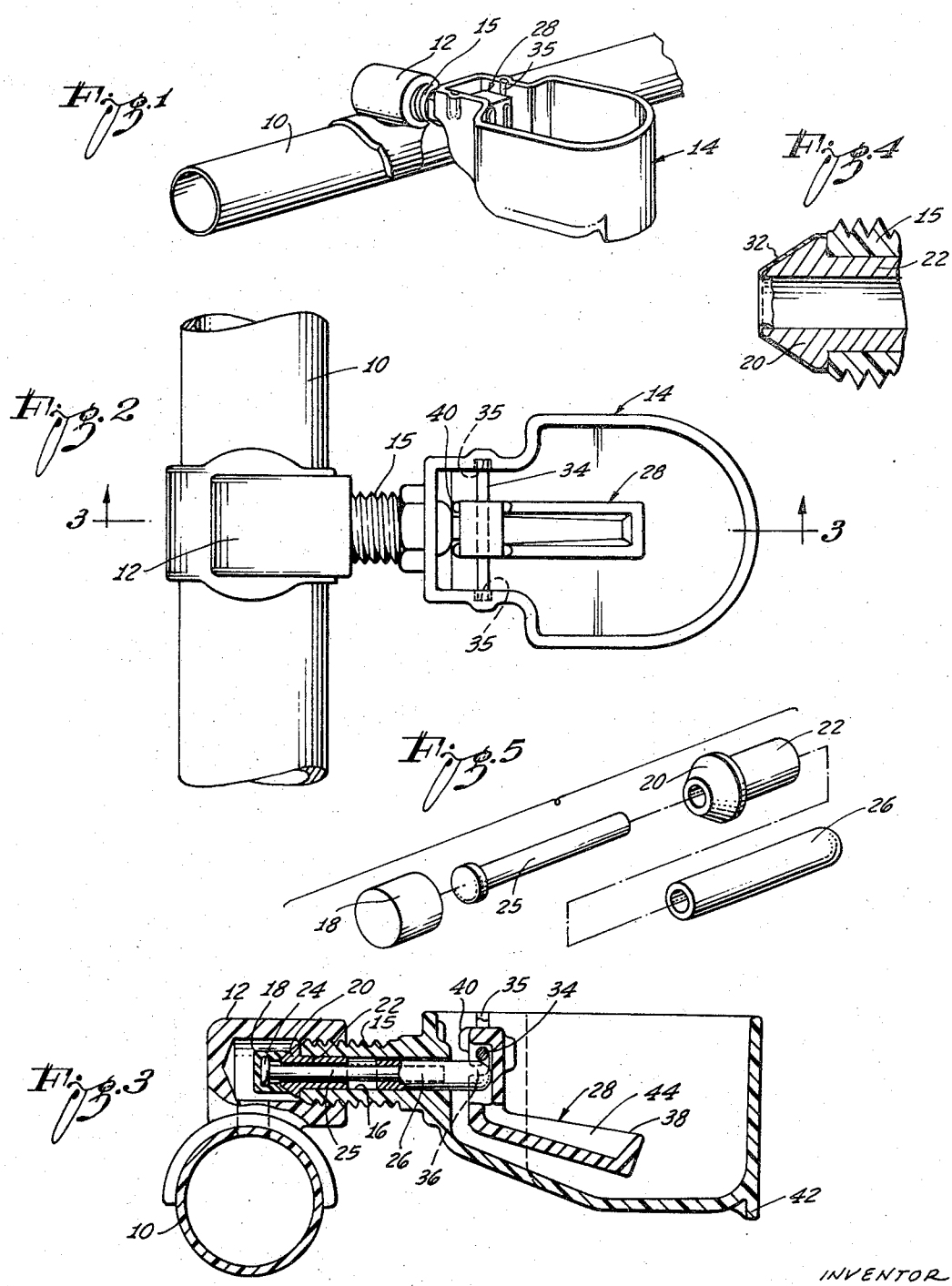

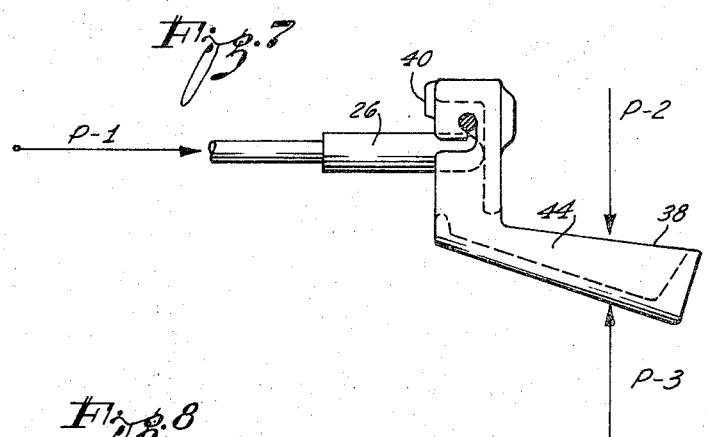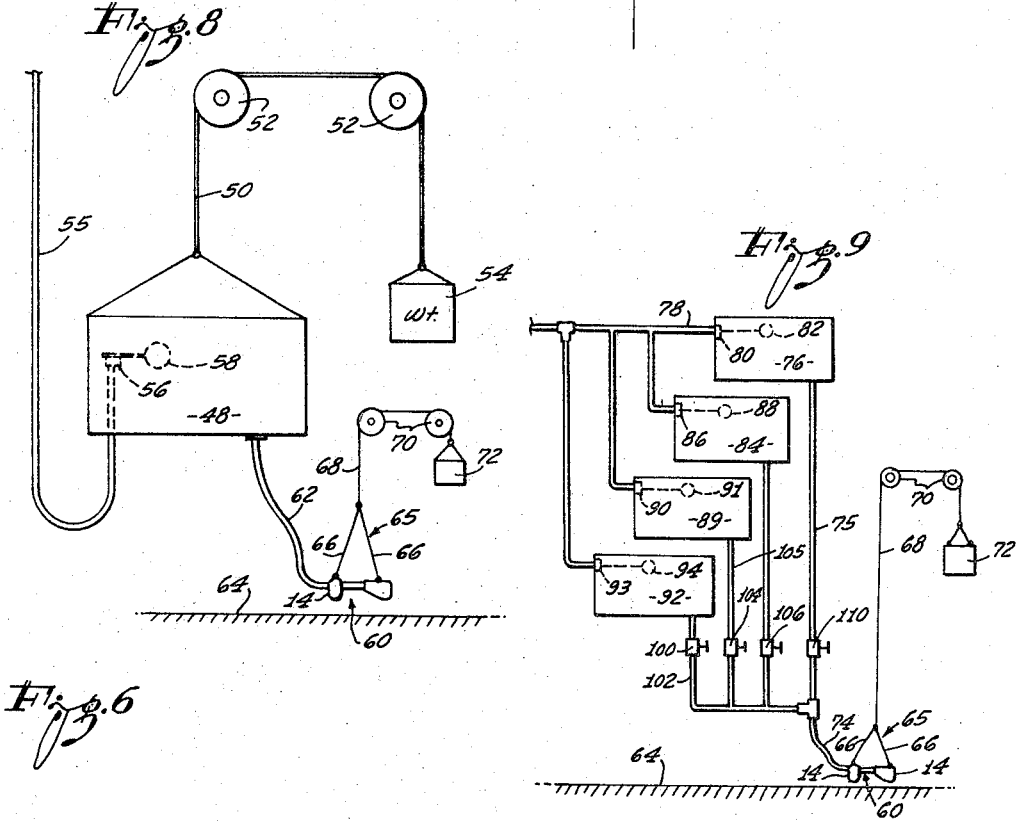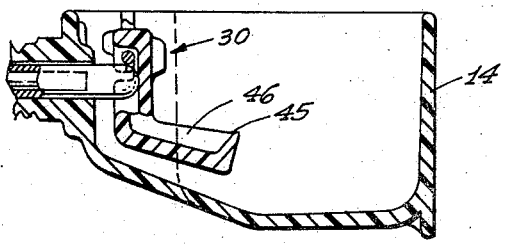

3,353,518
WATERING SYSTEM FOR POULTRY
Harold W. Hart, Glendale, Calif., assignor to H. W. Hart Manufacturing Company, Glendale, Calif., a corporation of California
Filed Oct. 8, 1965, Ser. No. 494,054
13 Claims. (Cl. 119—75)

This invention relates to a system for supplying drinking water to poultry from the time the birds are newly hatched through a period of growth to full maturity. More particularly, the invention is directed to the need by large scale commercial poultrymen for such a system that meets the changing conditions encountered during the growth period of the fowls and does so effectively with minimum attention and servicing.

A drinking water system for this comprehensive purpose must be based on a number of considerations. From the time that the chicks are first hatched, they must have full access to drinking water but throughout the whole growth period there must be no possibility of contamination of the drinking water by prolonged immersion of food particles with consequent bacteria action. The water must be close to floor level for access by the baby chicks but the baby chicks must not get wet. Because the environment should be dry and because moistening the droppings on the floor results in the breeding of flies, the water supply must be contained effectively at all times. A further important reason for effective containment of the water is that if water wastage is completely eliminated it becomes economical to give medication, for example expensive oral vaccine, to the baby chicks by adding the medication to the water supply. Such a medication procedure results in substantial saving in labor.

It has been found that the use of relatively small drinking cups in a water system may be relied upon to keep the water contained at all times with no splashing onto the chicks or onto the floor and it has been further found that with only shallow water in the cups, young birds old enough to carry food particles to the cups will remove the food particles from the cups before bacteria action becomes a problem. Watering cups for this purpose may be provided with valves controlled by trigger members that are operated by pecking by the birds. Watering cups of this type are disclosed in my Patent 2,845,046.

Merely incorporating such drinking cups into a drinking water system, however, fails to solve all the problems that must be met to keep down the mortality of the chicks. Commercial poultry raising is highly competitive and with baby chicks costing from twenty cents to fifty cents each, the mortality rate is a critical factor.

A basic difficulty arises from the fact that baby chicks are normally de-beaked on the first day to prevent cannibalism, both the upper and lower beaks being cut short. A newly truncated beak is so sensitive that the baby chick is not capable of pecking a valve-controlling trigger with operating force even if the chick has sufficient strength to do so. Consequently the water in a conventional cup is not replenished and the consequent dehydration of baby chicks may cause a drastic rise in the mortality rate.

With the passage of time, the truncated beaks become less sensitive and eventually some of the growing chicks learn to peck the triggers of the cups to obtain water. Unfortunately, however, relatively high pecking force is required to operate the trigger members of a conventional drinking cup and only a small percentage of the young birds ever learn the technique. With six or more birds depending on one bird to operate the trigger, even when the birds are mature, some birds will get insufficient water and if anything happens to the one bird, the others may be lost by dehydration. It is highly desirable, therefore, to raise the fowls in some manner that will cause all or nearly all of the birds to learn to obtain drinking water at will by simply pecking a valve-controlling trigger.

The present invention meets this need by providing a trigger action that may be graduated in accord with the rate of increase of the strength and pecking ability of the growing birds. For the newly hatched chicks, a float member is substituted for the usual trigger to control the cup valve and to provide automatic water replenishment with no need whatsoever for cooperation by the chicks. To start the process of learning to peck a trigger, the float member is shaped like a trigger and is capable of functioning like a trigger in the event that it is pecked by a chick. When the chick's beaks become less sensitive, the water pressure may be raised sufficiently to require slightly more operating force than can be afforded by the weight of the float member. Consequently water in the cup may drop without the valve opening. Water replenishment then requires pecking action but the float member retains a few drops of water to encourage the chick to touch the float and only an exceedingly light touch is required to lower the float for water replenishment. Once the float is depressed in this manner it stays down until its buoyancy causes it to respond to the rising water level in the cup. Under these conditions where only light pecking force is required to start the water flow and a relatively large amount of replenishing flow results from a single peck, the growing birds are induced to peck for water replenishment and no bird suffers for want of water.

The next step to promote the training of the fowls may consist simply of raising the water pressure slightly to cause the valve to close prompty after the float member is pecked. The float member is thereby caused to function strictly as a trigger but a highly sensitive trigger. As the fowls mature and a high percentage learn to peck for water, a less sensitive trigger action is needed and the final stage is entered by raising the water pressure still higher and substituting a conventional valve-controlling trigger for the float member, the transition by the fowls to this final stage being natural and free from complications.

To complete the solution to the overall problem, suitable safeguards are required to keep the water in the cups from becoming contaminated by the droppings from the birds. The invention meets this further requirement in two ways. First, a suitable guard is provided to keep the young birds from perching on the cups and on the adjacent conduit of the water system. Second, provision is made for progressively raising the level of the drinking cups relative to the floor in step with the growing size of the birds.

The teachings of the invention may be put into practice by transferring the chicks to a succession of living spaces, a first living space being equipped with low level drinking cups operated by float members for fully automatic water replenishment, a second living space being equipped with higher level cups under slightly higher water pressure for semi-automatic action by the float members, the third living space being equipped with still higher level cups and the water pressure being raised to cause the float members to act strictly as relatively sensitive triggers, the fourth and final living space having cups at a still higher level equipped with conventional triggers of substantially less sensitivity. If desired the second stage or the third stage may be omitted and in some instances both the second and third stage may be omitted.

In the preferred practice of the invention, however, the water system is sufficiently versatile to provide all four of the stages in the same living space. For this purpose the water system incorporates three provisions: first, adjustable water pressure; second, adjustable cup height; and, third, interchangeable float members and trigger members.

In addition to providing the described flexible water system, the invention provides an improved cup that is not only economical to fabricate, but also incorporates new and useful features. For economy of fabrication, the cup itself and the nipple for connecting the cup to the water system are molded of a suitable plastic in one piece and the working parts are simple parts designed for easy assembly without the need of special tools or the need for special processing. Among the features are the design of the float members and trigger members for interchangeability without any possibility of a member being accidentally dismantled by a peck by a bird. Another feature is the concept of coating a brass valve seat with Teflon for use with an elastomeric valve member that does not contain a copper inhibitor. Still another feature is the employment of a novel cup configuration that provides a forward drip vane. In some installations for mature fowls, the drinking cups are placed above the front edge of a feed trough and in the event any water reaches the outer surface of the cup and drains from the outer surfaces, the new cup configuration diverts the dripping water forward clear of the underlying trough.

The various features and advantages of the invention may be understood from the following detailed description and the accompanying drawings.

In the drawings, which are to be regarded as merely illustrative:

FIG. 1 is a fragmentary perspective view showing a drinking cup connected to a conduit of a watering system;

FIG. 2 is a plan view of the same cup showing the cup equipped with a float member for valve control;

FIG. 3 is a sectional view taken as indicated by the line 3—3 of FIG. 2 to show the working parts of the valve mechanism;

FIG. 4 is a greatly enlarged fragment of FIG. 3 showing how a brass valve-seat member may be coated with Teflon;

FIG. 5 is an exploded view showing some of the parts that enter into the assembly of the cup mechanism;

FIG. 6 is a fragmentary sectional view similar to FIG. 3 showing how a trigger member may be substituted for the float member;

FIG. 7 is a diagram showing the forces involved in the operation of a float member;

FIG. 8 is a diagrammatic elevational view showing a simplified watering system with provision for varying the pressure of the water and provision for varying the height of the watering cups; and FIG. 9 is a diagram of a similar system with a different provision for varying the water pressure.

Referring to the drawings, FIGS. 1, 2 and 3 show a portion of a conduit 10 of a water system which is preferably made of a suitable plastic and which has an outlet fitting 12 bonded thereto with an internal screw thread for connection to a drinking cup 14. Preferably, but not necessarily, the drinking cup 14 is a molded plastic body with an integral nipple 15 that screws into the outlet fitting 12. The nipple 15 provides a passage 16 through which water may flow from the conduit under control of a valve mechanism that extends through the passage.

The end of the plastic nipple 15 may form a convex conical valve seat for cooperation with an elastomeric valve member 18, but preferably such a valve seat is formed by a conical enlargement 20 of a ferrule or bushing 22 that is mounted in the outer end of the passage 16. The elastomeric valve member 18 is cup-shaped for cooperation with the convex conical valve seat and is mounted on an enlargement 24 of a pin 25 that is slidingly mounted in the ferrule 22 with sufficient clearance for adequate water flow through the ferrule. Fixedly mounted on the pin 25 by a forced fit, is a plunger 26 which serves in effect as an extension of the pin for moving the valve member 18 to open position in opposition to the water pressure in the conduit. The plunger 26 which is formed with a rounded nose for actuation by a suitable control member fits slidingly in the passage 16 with clearance for water flow.

In FIGS. 1, 2 and 3 the control member is a float member, generally designated by numeral 28, that operates in a novel manner and in FIG. 6 the control member is a trigger member 30 that operates in the manner taught by the prior art.

The ferrule 22 together with the pin 25 and the plunger 26 may be made of brass and the elastomeric valve member 18 may contain a copper inhibitor in a well known manner to prevent chemical interaction with the brass. If, however, the elastomeric valve member 18 contains a copper inhibitor and is used with a valve seat that is formed by the end of a plastic nipple, the copper inhibitor will cause the plastic valve seat to deteriorate by chemical action. A feature of the invention is that this problem is solved by omitting the copper inhibitor and, instead, coating the valve seat for enlargement 20 of the ferrule 22 with a thin layer of Teflon, such a layer or coating being indicated at 32 in FIG. 4.

For the purpose of mounting the two control members interchangeably, the cup 14 is provided with a transverse pin 34 which spans the interior of the cup and serves as a pivot means. In the construction shown two opposite walls of the cup 14 are formed with downwardly extending grooves 35 which are recessed at their lower ends to provide seats for the opposite ends of the transverse pin 34. The plastic walls of the cup are sufficiently flexible to permit the walls to be spread apart slightly for assembly of the transverse pin to the cup.

The control member 28 shown in FIGS. 1, 2 and 3 is a float member that under certain conditions functions solely as a float and under certain other conditions is capable of functioning purely as a trigger. As indicated in FIG. 3 the float member 28 is formed with an angular slot 36 to receive the transverse pin 34, the slot having an entrance of slightly smaller width than the diameter of the pin to permit the float member to be forced onto the pin with a snap action. Once the float member is mounted on the transverse pin the restricted entrance to the angular slot opposes any upward movement of the float member relative to the pin and the float member seats firmly on the pin to resist in a positive manner any downward force against the float member such as a peck by a fowl.

At the closed position of the valve member 18 shown in FIG. 3, the plunger 26 is held at its rearward position by the pressure of the water against the valve member 18 and at this position the plunger holds the float member up as shown with the relatively long operating arm 38 of the float member spaced above the bottom of the cup. Any force that tends to rotate the float member 38 counterclockwise as viewed in FIG. 3 is limited by the rocking of a pair of spaced bosses 40 of the float member against the inner surface of the cup, and, on the other hand clockwise rotation of the float member is limited by movement of the operating arm 38 against the bottom wall of the cup. Downward movement of the operating arm 38 toward the bottom wall of the cup retracts the valve member 18 from the valve seat 20 to permit water to flow from the conduit 10 through the passage 16 into the cup 14. In the event that any moisture reaches the exterior surface of the cup in such amount as to cause drainage, the shape in profile of the cup as seen in FIG. 3 directs the drainage towards the front of the cup where the cup is formed with a downwardly extending drip vane 42. Thus any dripping that may occur from the cup for any anomalous reason will miss an underlying feed trough that is set back slightly from the front end of the cup.

The float member 28 is made of a plastic which is of sufficiently low specific gravity to be buoyant in water and for this purpose the float member may be made of polypropylene. Thus if the arm 38 is immersed in water, the arm tends to swing upward and thus permit water pressure to force the valve member 18 to closed position. It is to be noted that the control arm 38 forms a shallow receptacle 44 which traps a small quantity of the water and thus induces thirsty birds to touch the float member.

The trigger member 30 shown in FIG. 6 is similar in construction to the float member 28 but has a relatively short operating arm 45 that is incapable of functioning as a float. The operating arm 45 forms a shallow receptacle 46 to retain a small quantity of water to encourage fowls to peck the trigger member.

FIG. 8 shows diagrammatically a water system wherein a tank 48 is suspended by an overhead cable 50 that passes over a pair of pulleys 52 and carries a suitable counterweight 54, the counterweight serving to maintain the reservoir tank at whatever level it may be placed. A hose 55 from a suitable water source keeps the tank 48 filled under the control of a valve 56 that is operated by a float 58. A conduit structure, generally designated 60, equipped with distributed drinking cups 14 of the construction heretofore described is supplied with water from the tank 48 by means of a flexible hose 62. For supplying water to newly hatched chicks, the conduit structure 60 may rest on the floor 64.

The conduit structure 60 is provided with suitable antiperch means to keep the birds from perching on the inner ends of the cups 14 and on adjacent portions of the conduit structure. The anti-perch means may comprise what may be termed a spider, generally designated 65, having downwardly divergent wire legs 66 that are connected to the conduit structure at sufficiently low angles to interfere with birds that have perching tendencies. The spider 65 is adapted to serve as means for suspending the conduit structure 60 adjustably through a range of levels above the floor 64. For this purpose the spider 65 is suspended from a light cable 68 which passes over pulleys 70 and carries a suitable counterweight 72 that maintains the conduit structure at any level to which it may be adjusted.

FIG. 7 shows diagrammatically the forces which affect a control member, the control member in this instance being the float member 28. The arrow P–1 represents the force exerted by the plunger 26 in response to the pressure of water against the valve member 18. The arrow P–2 represents the force of gravity acting on the operating arm 38 in a direction to tend to retract the plunger 26 for opening the valve. Finally, the arrow P–3 represents the buoyancy or the upward force on the operating arm 38 that is created by the displacement of water by the operating arm. Since the material of the float member 28 is of lower specific gravity than water, the buoyancy force P–3 always exceeds the gravity force P–2 when the control arm is immersed in water. It is apparent that the buoyancy force P–3 tends to permit the water pressure represented by force P–1 to close the valve whereas the gravity force P–2 tends to open the valve in opposition to the water pressure.

If, for what may be termed the first stage of operation, the water pressure that creates the force P–1 is less than a head of fifteen inches, say a head of between ten and fifteen inches, the gravity force P–2 opens the valve in opposition to the force P–1 whenever the water level tends to fall below the operating arm 38. On the other hand, when the operating arm 38 becomes submerged the buoyancy force P–3 dominates to swing the operating arm upward and thus permit the water pressure to close the valve. In this manner and under these conditions the float member 28 functions solely as a float for automatic water replenishment to maintain a given level of water in the cup without any cooperation whatsoever on the part of the newly hatched chicks. During this first stage of operation, the conduit structure 60 may rest directly on the floor 64 and the reservoir tank 48 is lowered to provide the required head of less than fifteen inches. In practice it is a simple matter to ascertain empirically the correct level of the reservoir tank 48 at which the float member 28 functions solely as a float for automatic water replenishment.

For the second stage of operation after the chicks are started on their growth, the conduit structure 60 may be lifted slightly clear of the floor and the reservoir tank 48 may be adjusted in height to create what may be termed a critical head of approximately fifteen inches, at which head the gravity force P–2 is not adequate to overcome the force P–1 to open the valve when the valve is closed but is adequate to keep the valve open once the valve is open. Under such conditions the water in the drinking cup will drop progressively as it is consumed and the water may drop until the operating arm 38 is entirely above water level. Sooner or later, however, the water trapped in the receptacle 44 that is formed by the operating arm 38 will attract a thirsty chick and the resultant contact of the chick's beak against the operating arm will open the valve in opposition to the water pressure and thus permit the operating arm 38 to drop. Thereafter water is admitted to the cup by the open valve until the water level rises sufficiently to cause the buoyancy force P–3 to overcome the gravity force P–2 to cause the operating arm 38 to swing upwardly and thereby permit the water pressure to cause the valve to close. In this manner the baby chicks come to associate pecking of the control arm 38 with flow of new water.

For the third stage of operation, the conduit structure 60 is again raised slightly in accord with the growing height of the fowls and the reservoir tank 48 is adjusted upward to provide a head slightly above the critical head, say a head of seventeen to eighteen inches at which the gravity force P–2 created by the operating arm 38 is insufficient to open the valve in opposition to the pressure of the water represented by force P–1. Under these conditions the valve opens only when a pecking force is applied to the operating arm 38 and the valve closes promptly after the momentary force is applied. Early in this third stage the water level may at times drop relatively low in the drinking cup but sooner or later a fowl will be attracted in the receptacle 44 that is formed by the operating arm and will thereby learn that pecking the operating arm results in flow of fresh water. Later in the stage it is found that so many of the birds have learned the pecking technique that the water level remains relatively high.

For the fourth and final stage, the non-buoyant trigger member 30 is substituted for the float member 28 as shown in FIG. 6. In addition the water head is increased, say to five or six feet to require a strong pecking force for water flow.

In the modified water system that is shown diagrammatically in FIG. 9, the usual conduit structure 60 equipped with drinking cups 14 is supplied by a flexible hose 74 from a standpipe 75. The upper end of the standpipe 75 is connected to an upper stationary tank 76 which is supplied with water by a pipe 78 under the control of a valve 80 which is governed by a float 82. A second lower fixed tank 84 is supplied with water by a pipe 85 through a valve 86 that is controlled by a float 88. A third still lower tank 89 supplied by the pipe 85 has a valve 90 controlled by a float 91. Finally a lowest tank 92 is supplied by the pipe 85 through a valve 93 controlled by a float 94.

A cutoff valve 100 in a pipe 102 controls flow from the lowest tank 92 to the conduit structure 60; a cutoff valve 104 in a pipe 105 controls flow from the next higher tank 89 to the conduit structure 60; a cutoff valve 106 in a pipe 108 controls flow from the next higher tank 84 to the conduit structure 60; and, finally, a cutoff valve 110 in the standpipe 75 controls flow from the highest tank 76 to the conduit structure 60. The cutoff valve 100 is opened and the other cutoff valves are closed for the first stage of operation; the cutoff valve 104 is opened and the other cutoff valves are closed for the second stage of operation; the cutoff valve 106 is opened and the other cutoff valves are closed for the third stage of operation; and, finally, the cutoff valve 110 is opened and the other cutoff valves are closed for the fourth stage of operation.

My description of the invention in specific detail will suggest various changes, substitutions and other departures from my disclosure within the spirit and scope of the appended claims.

I claim:

1. A method of supplying water to fowls, including the steps of:
   providing a supply of water having a pressure variable in accordance with the age of the fowl to provide for an increase in water pressure as the age of the fowl increases,
   providing a watering cup,
   providing a valve between the supply of water and the watering cup to obtain a controlled introduction of water from the supply of water to the watering cup,
   providing in the watering cup a control member having characteristics of floating on the water in the cup and actuable by the fowl to obtain an operation of the valve for a controlled introduction of water to the watering cup in accordance with the variable pressure of the water and in accordance with the characteristics of the control member, and
   providing for variations in the characteristics of the control member relative to variations in the water pressure to require an increased force to be exerted on the control member to obtain an operation of the valve for the introduction of water to the watering cup as the age of the fowl increases.

2. The method set forth in claim 1, including the step of:
   providing for variations in the vertical level of the cup as the age of the fowl increases.

3. A method of supplying water to fowls, including the steps of:
   providing a supply of water having a pressure variable in accordance with the age of the fowl to provide for an increase in water pressure as the age of the fowl increases,
   providing a watering cup,
   providing a valve between the supply of water and the watering cup to obtain a controlled introduction of water from the supply of water to the watering cup,
   providing in the watering cup a control member having characteristics of floating on the water in the cup to obtain an operation of the valve for the introduction of water to the cup for low water pressures without any actuation of the control member by the fowl and to obtain an operation of the valve for the introduction of water to the cup for increased water pressures upon an actuation of the control member by the fowl,
   providing for variations in the characteristics of the control member relative to variations in the water pressure, and
   providing for variations in the vertical level of the cup as the age of the fowl increases.

4. The method set forth in claim 3 wherein the control member is provided with characteristics of obtaining a continued operation of the valve for the introduction of water to a particular level in the cup upon an actuation of the control member by fowl of moderate age.

5. Apparatus for supplying water to fowls, including:
   means for providing water having a pressure variable in accordance with the age of the fowls,
   means for providing variations in the water pressure to conform with the age of the fowls,
   a watering cup for receiving water for the fowls,
   valve means operatively coupled to the watering cup and to the water-providing means for providing a controlled introduction of water from the water-providing means to the watering cup, and
   control means disposed within the watering cup and having characteristics of floating on the water in the cup and constructed to provide an operation of the valve means for the introduction of water to the cup for low water pressures without any actuation of the control means by the fowl and to provide an operation of the valve means for the introduction of water to the cup for increased water pressures upon an actuation of the control means by the fowl.

6. Apparatus as set forth in claim 5 wherein the control means is further constructed to provide, upon an actuation of the control means by the fowl, for a continued operation of the valve means for the introduction of water to a particular water level in the cup for moderate water pressures between the low water pressures and the increased water pressures.

7. A method of supplying water to fowls, including the steps of:
   providing a supply of water under pressure,
   providing a watering cup connected to the supply of water,
   providing a valve between the supply of water and the watering cup to obtain a controlled introduction of water from the supply of water to the watering cup,
   providing in the watering cup a control mechanism for use by young fowls to obtain a controlled operation of the valve for adding water in response to a lowering of the water level in the cup and in response to pecking force by the young fowls to make sure water is available to the young fowls at all times and to give the young fowls an opportunity to learn to peck the control mechanism, and
   when the young fowls increase in age decreasing the sensitivity of the control mechanism to rely primarily on pecking force and to require a pecking force of increased intensity for the admission of water to the cup thereby to discourage excessive admission of water to the cup.

8. The method set forth in claim 7 wherein the control mechanism constitutes a float on the water with a sensitivity for young fowls to provide for at least a particular level of water in the watering cup without requiring any pecking by the fowls and with a sensitivity for fowls of advanced age to require the pecking force of the increased intensity for the admission of water to the cup.

9. The method set forth in claim 7 wherein the control mechanism constitutes a float on the water with a sensitivity for fowls of advanced age to require the pecking force of the increased intensity for the admission of water to the cup only during the application of such pecking force and with a sensitivity for fowls of moderate age to require a pecking force for the admission of water to the cup to the particular level.

10. Apparatus for supplying water to fowls, including:
   a watering cup for receiving water for the fowls,
   means for providing for an introduction of water at a variable pressure,
   means operatively coupled to the last mentioned means for varying the pressure of the water in accordance with the age of the fowls,
   control means including a plurality of pivotable arms of different lengths dependent upon the age of the fowl and each pivotable at one end and having characteristics with at least one of the arms floatable on the water in the cup at the end opposite to the pivotable end, said arms being adapted to be substituted one for another, each to be disposed within the watering cup in pivotable relationship to the cup,
   valve means responsive to the pressure of the water from the water-providing means and to the pivotable end of the pivotable arm of the control means for obtaining the introduction of water to the cup upon an actuation of the control means with a force dependent upon the age of the fowl.

11. Apparatus as set forth in claim 10 wherein the length of one arm of the control means is relatively great for young fowl and the other is relatively short for fowl of advanced age.

12. Apparatus as set forth in claim 10 wherein the length of one of the arms of the control means is relatively great to provide for the operation of the valve means at relatively low water pressures for obtaining the introduction of water into the cup without any actuation of the control means by the fowl and the other arm is relatively short to provide for the operation of the valve means at relatively high water pressures for obtaining the introduction of water into the cup upon an actuation of the control means by the fowl.

13. Apparatus as set forth in claim 10 wherein means are provided for adjusting the vertical level of the watering cup in accordance with the variations in the pressure of the water from the water-providing means.

References Cited
UNITED STATES PATENTS

| | | | |
|---|---|---|---|
| 2,067,112 | 1/1937 | Ahlman | 119—75 |
| 2,749,882 | 6/1956 | Butker | 119—74 |
| 2,845,046 | 7/1958 | Hart | 119—75 |
| 2,848,013 | 8/1958 | Kofford | 119—81 XR |
| 3,008,451 | 11/1961 | Curry | 119—72.5 |

HUGH R. CHAMBLEE, *Primary Examiner.*
SAMUEL KOREN, *Examiner.*